(12) United States Patent
Eckhardt et al.

(10) Patent No.: US 10,700,597 B1
(45) Date of Patent: Jun. 30, 2020

(54) DISTRIBUTION TRANSFORMER POWER FLOW CONTROLLER

(71) Applicants: Chad Eckhardt, Raleigh, NC (US); Stephen Timothy Watts, Fuquay-Varina, NC (US)

(72) Inventors: Chad Eckhardt, Raleigh, NC (US); Stephen Timothy Watts, Fuquay-Varina, NC (US)

(73) Assignee: Gridbridge, Inc., Raleigh, NC (US)

( * ) Notice: Subject to any disclaimer, the term of this patent is extended or adjusted under 35 U.S.C. 154(b) by 609 days.

(21) Appl. No.: 14/310,963

(22) Filed: Jun. 20, 2014

Related U.S. Application Data

(63) Continuation-in-part of application No. 13/724,846, filed on Dec. 21, 2012, now abandoned.

(51) Int. Cl.
*H02M 1/42* (2007.01)

(52) U.S. Cl.
CPC ................ *H02M 1/4208* (2013.01)

(58) Field of Classification Search
CPC .................................................. H02M 3/335
See application file for complete search history.

(56) References Cited

U.S. PATENT DOCUMENTS

| | | | | |
|---|---|---|---|---|
| 4,697,136 A | * | 9/1987 | Ishikawa | H02J 1/10 136/293 |
| 7,843,166 B2 | | 11/2010 | Shimada et al. | |
| 8,013,702 B2 | | 9/2011 | Haj-Maharsi et al. | |
| 9,042,129 B2 | * | 5/2015 | Wijekoon | H02J 3/00 363/35 |
| 2006/0119184 A1 | * | 6/2006 | Chen | H02J 9/062 307/66 |
| 2008/0246445 A1 | * | 10/2008 | Wrathall | G05F 1/70 323/207 |
| 2009/0152952 A1 | * | 6/2009 | Evans, Sr. | H02J 3/32 307/80 |
| 2010/0201338 A1 | * | 8/2010 | Haj-Maharsi | H02M 1/4233 323/305 |
| 2010/0220499 A1 | | 9/2010 | Haj-Maharsi et al. | |

(Continued)

OTHER PUBLICATIONS

Office Action dated Apr. 17, 2015.
(Continued)

*Primary Examiner* — Daniel Kessie
(74) *Attorney, Agent, or Firm* — Andrew R. Shores; Williams Mullen

(57) ABSTRACT

A distribution transformer power flow controller apparatus includes at least one external source terminal configured to be coupled to a distribution transformer, at least one external load terminal configured to be coupled to a load, and a converter circuit configured to be coupled between the at least one external source terminal and the at least one external load terminal to provide series connection of the converter circuit with the load and to control a power transfer of the distribution transformer. The converter circuit may be configured to control a reactive power transfer of the distribution transformer. The converter circuit may also be configured to control a reactive power transfer and a real power transfer. In some embodiments, the converter circuit may be configured to be coupled to at least one energy storage capacitor, at least one battery and/or at least one power generation device.

17 Claims, 16 Drawing Sheets

(56) References Cited

U.S. PATENT DOCUMENTS

2012/0051104 A1\* 3/2012 Ohshima ............... H02J 3/14
363/84
2013/0184884 A1\* 7/2013 More ............... F03D 7/0284
700/291

OTHER PUBLICATIONS

Bala S., "hybrid Distribution Transformer: Convept Development and Field Demonstration", Energy Conversion Congress and Exposition (ECCE), 2012 IEEE, pp. 4061-4088, Sep. 2012.
Watanabe E.H., "GCSC'gate controlled series capacitor: a new FACTS device for series compensation of transmission lines," Transmission and Distribution Conference and . . . Exposition: Latin America, 2004 IEEE/EX, pp. 981-986, Nov. 8-11, 2004.
Wilk, J.A., "Characteristics of the Magnetic Energy Recovery Switch (MERS) as a Series FACTS Controller," Power Delivery, IEEE Transactions on, vol. 24, No. 2., pp. 828-836, Apr. 2009.

\* cited by examiner

US 10,700,597 B1

DISTRIBUTION TRANSFORMER POWER FLOW CONTROLLER

CROSS-REFERENCE TO RELATED APPLICATION

The present application is a continuation-in-part of U.S. application Ser. No. 13/724,846 titled "Distribution Transformer Power Flow Controller" filed on Dec. 21, 2012, which is incorporated herein by reference in its entirety.

STATEMENT REGARDING FEDERALLY SPONSORED RESEARCH OR DEVELOPMENT

Not applicable to this application.

BACKGROUND

Field of the Disclosure

The inventive subject matter relates to power distribution apparatus and methods and, more particularly, to distribution transformer apparatus and methods.

Background of the Disclosure

Electric utility systems typically distribute power using transmission and distribution networks. High voltage (e.g., 100 kV and above) transmission networks are used to convey power from generating stations to substations that feed lower voltage (e.g., less than 100 kV) distribution networks that are used to carry power to homes and businesses. In a typical distribution network used in residential areas, for example, a 7.2 kV single-phase distribution line may be run along a street, with individual residences being fed via respective service drops from distribution transformers that step down the voltage to a 120/240V service level. The electrical distribution system in the United States, for example, includes millions of such distribution transformers.

Although conventional distribution transformers are rugged and relatively efficient devices, they generally have limited control capabilities. For example, the impedance of the load connected to a distribution transformer typically dictates reactive power flow through the transformer, as typical conventional distribution transformers have no ability to control reactive power flow. In addition, while some traditional distribution transformers may be able to adjust voltage provided to the load using mechanisms such as tap changers, such capabilities are typically not used in a distribution transformer and, even if used, typically cannot effectively regulate the load voltage in real time to compensate for transient sags and spikes. Conventional distribution transformers also typically have no capability to compensate for harmonics introduced by non-linear loads. Hybrid transformers that may address some of these issues are described in U.S. Pat. No. 8,013,702 to Haj-Maharsi et al., U.S. Patent Application Publication No. 2010/0220499 to Haj-Maharsi et al., U.S. Patent Application Publication No. 2010/0201338 to Haj-Maharsi et al. and the article by Bala et al. entitled "Hybrid Distribution Transformer: Concept Development and Field Demonstration," IEEE Energy Conversion Congress & Exposition, Raleigh, N.C. (Sep. 15-20, 2012).

SUMMARY

Some embodiments of the inventive subject matter provide an apparatus including at least one external source terminal configured to be coupled to a distribution transformer and at least one external load terminal configured to be coupled to a load. The apparatus further includes a converter circuit configured to be coupled between the at least one external source terminal and the at least one external load terminal to provide series connection of the converter circuit with the load and to control a power transfer of the distribution transformer. In some embodiments, the converter circuit may be configured to control a reactive power transfer of the distribution transformer. In further embodiments, the converter circuit may be configured to control a reactive power transfer and a real power transfer. In some embodiments, the converter circuit may be configured to be coupled to at least one energy storage device, such as a capacitor, at least one battery and/or at least one power generation device.

In some embodiments, the converter circuit may include a transformer having a first winding configured to be coupled to the at least one external source terminal and to the at least one external load terminal and an inductor and a switching circuit configured to be coupled in series with a second winding of the transformer. In some embodiments, the switching circuit may operate at a fundamental frequency of an output voltage of the distribution transformer.

In some embodiments, the converter circuit may include an inductor and a switching circuit configured to be coupled to the at least one external source terminal and the at least one external load terminal. The switching circuit may operate at a nominal fundamental frequency of an output voltage of the distribution transformer.

In some embodiments, the at least one external source terminal, the at least one external load terminal and the converter circuit may be packaged in a unit configured to be mounted proximate the distribution transformer. For example, the unit may be configured to be mounted on and/or in a housing of the distribution transformer and/or on a structure supporting the distribution transformer. In some embodiments, the apparatus may further include a communications circuit coupled to the converter circuit and configured to support control and/or monitoring of the converter circuit.

Further embodiments of the inventive subject matter provide an apparatus including at least one external source terminal configured to be coupled to a distribution transformer, at least one external load terminal configured to be coupled to a load, and a converter circuit coupled to at least one energy storage device and configured to be coupled to the at least one external source terminal and the at least one external load terminal to provide series connection of the converter circuit with the load. The converter circuit is configured to generate a voltage between the at least one external source terminal and the at least one external load terminal responsive to a current and a voltage at the at least one external source terminal. The converter circuit may be configured to generate the voltage between the at least one external source terminal and the at least one external load terminal to provide a desired reactive power flow.

In some embodiments, the converter circuit may include a switching circuit configured to couple at least one energy storage device to the at least one external source terminal and/or the at least one external load terminal responsive to a drive control signal. The apparatus further includes a control circuit configured to generate a reference voltage signal responsive to the current at the at least one external source terminal and a reactive power command signal, to generate a voltage control signal responsive to the reference voltage signal and the voltage at the at least one external source terminal and to generate the drive control signal responsive to the voltage control signal. The converter circuit may be further configured to regulate a DC voltage of the at least one energy storage device.

Further embodiments provide methods of retrofitting an existing distribution transformer. A transformer power flow controller unit including a converter circuit may be mounted proximate the existing distribution transformer. External terminals of the transformer power controller unit are connected to a secondary of the distribution transformer and to a load to couple the converter circuit in series with the load. The converter circuit is operated to control a power transfer of the distribution transformer. The methods may further include actuating a switch in the transformer power flow control unit to bypass the converter circuit.

DETAILED DESCRIPTION

Figure 1:
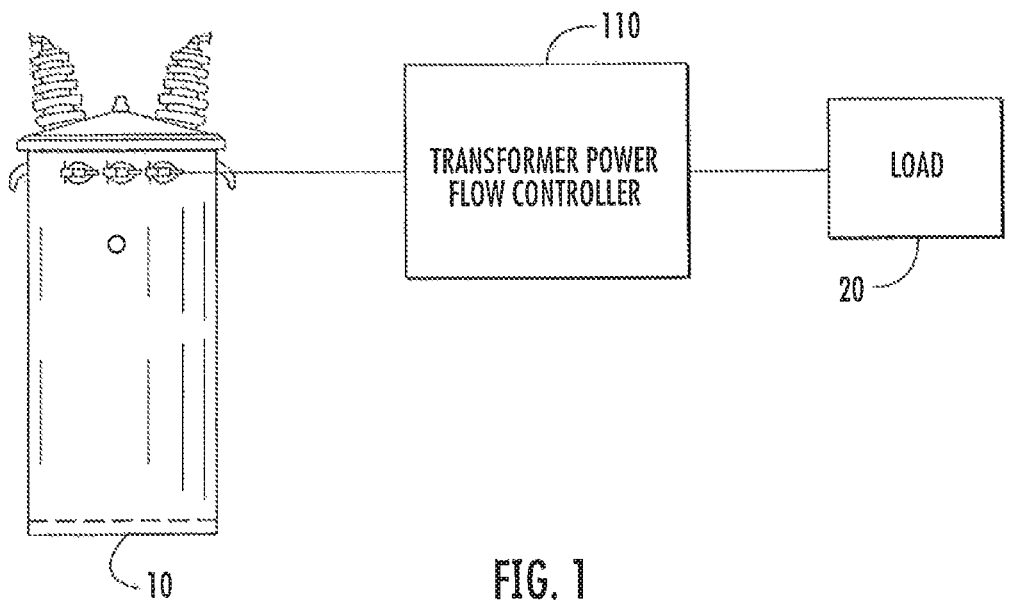
FIG. 1 is a schematic diagram illustrating an application of a distribution transformer power flow controller according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Some embodiments of the inventive subject matter arise from a realization that improved performance may be obtained from distribution transformers by using them in conjunction with a solid-state power flow controller that may be configured to be coupled in line with the transformer, e.g., between the transformer and the load in a service drop. Millions of distribution transformers are currently used in power distribution systems, and replacement of these devices with solid state or hybrid transformers would generally be prohibitively costly. In addition, replacing existing devices is also potentially wasteful, as existing devices are generally rugged and stand to provide years of additional service with relatively low maintenance. However, conventional distribution transformers typically provide no reactive power control. Such capability may be provided, however, by transformer power flow controller units configured for retrofit of existing distribution transformer installations. Such devices can be relatively low-cost, low voltage devices that are installed on the secondary side of the transformer.

Figure 2:
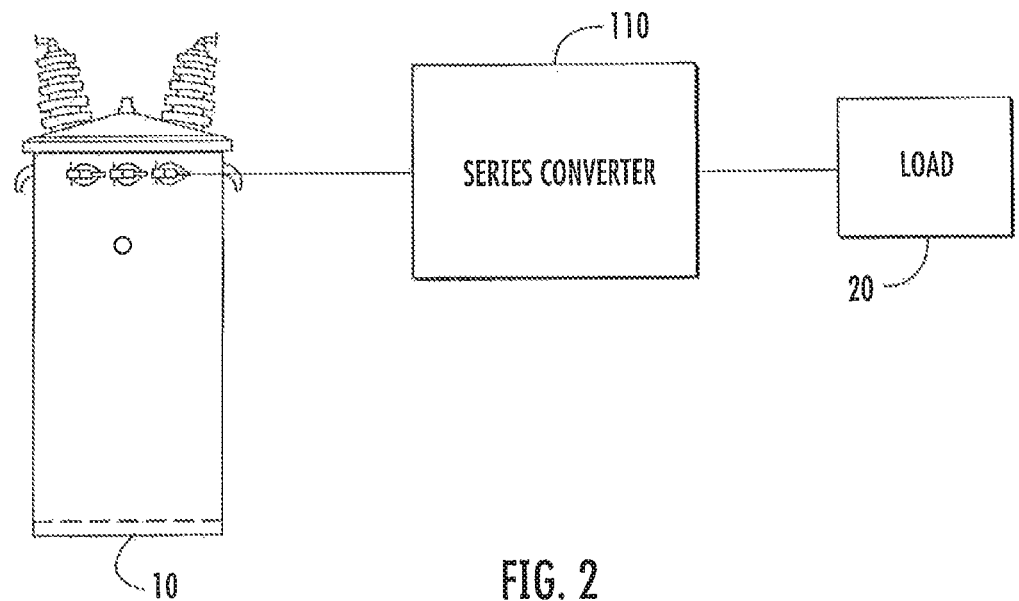
FIG. 2 is a schematic diagram illustrating a transformer power flow controller in the form of a series converter according to some embodiments.

FIG. 1 illustrates an exemplary application of a transformer power flow controller 110 according to some embodiments of the inventive subject matter. The transformer power flow controller 110 is configured to be coupled to a distribution transformer 10 and to a load 20. The load 20 may take the form of multiple loads. Although FIG. 1 conceptually illustrates the distribution transformer 10 as a pole-mounted unit, it will be appreciated that the distribution transformer 10 may be pole-mounted, pad-mounted or may take some other form. The transformer power flow controller 110 may include at least one external source terminal configured to be coupled to at least one secondary terminal 1 of the distribution transformer 10, and at least one external terminal configured to be coupled to the load 20. As explained in greater detail below, the transformer power flow controller 110 may be configured to control a reactive power flow at the secondary terminal 11. In further embodiments, the transformer power flow controller 110 may also be configured to control real power flow, using, for example, an attached energy storage device, such as at least one battery, and/or power generation device or source (AC or DC via a coupled inverter), such as a photovoltaic system (e.g., panel or module), fuel cell or the like. As shown in FIG. 2, in some embodiments, the transformer power flow controller 110 may be implemented as a series connected converter. For example, in embodiments shown below, the transformer power flow controller 110 may be configured to be directly connected in series with the load 20, or may be transformer isolated using a transformer configured to be coupled in series with the load 20.

Figure 3:
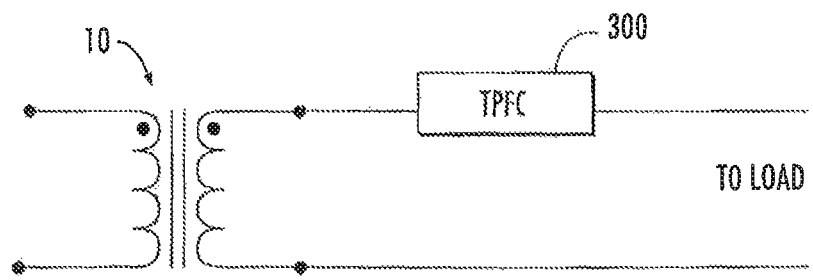
FIGS. 3-6 are schematic diagrams illustrating various applications of transformer power flow controllers for various types of electrical service arrangements according to some embodiments.
Figure 4:
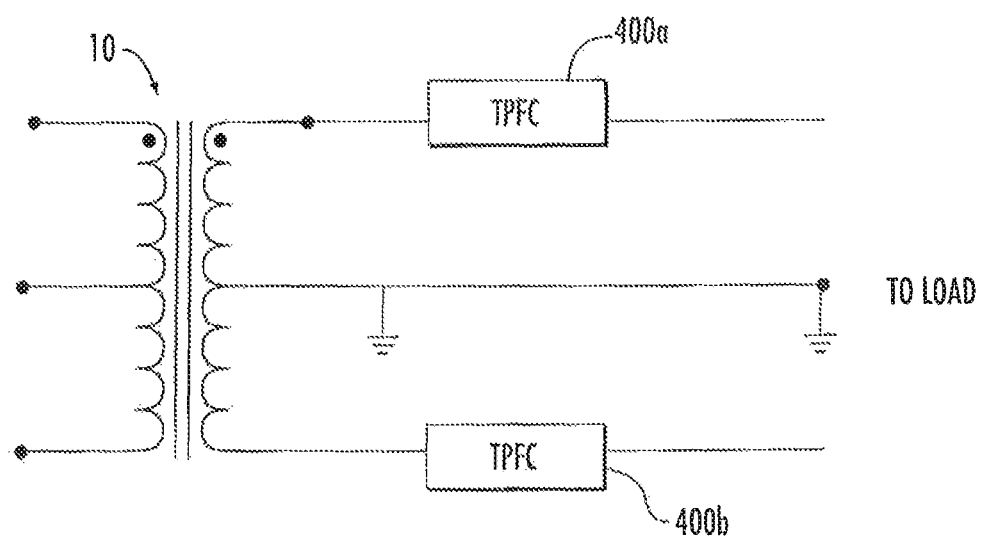
Figure 5:
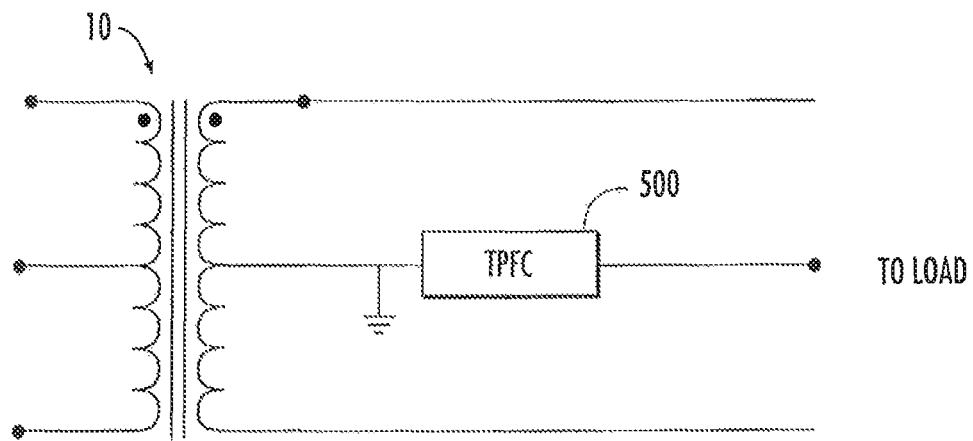
Figure 6:
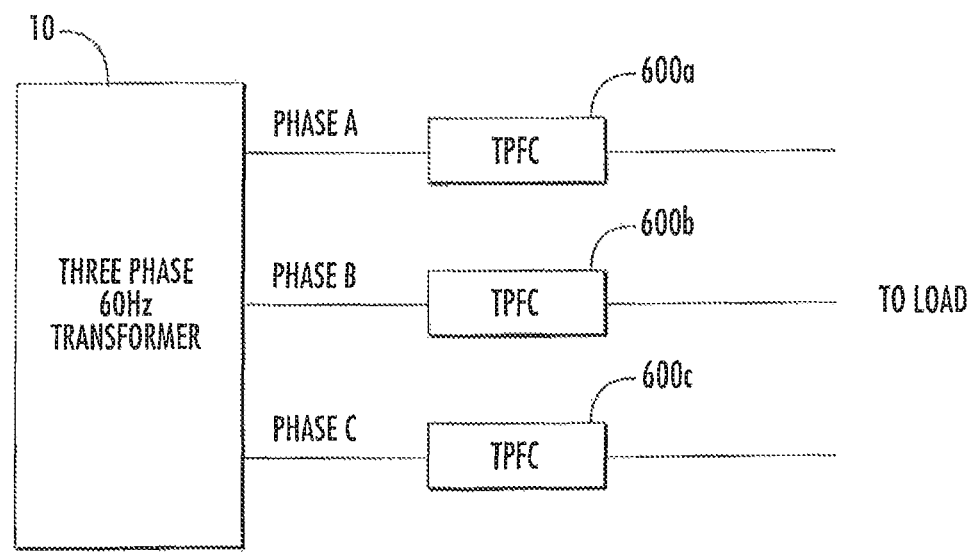

FIGS. 3-6 illustrate various applications of a transformer power flow controllers for various single, split-phase and three phase applications. FIG. 3 illustrates a typical single-phase application in which a transformer power flow controller (TPFC) unit 300 is connected in series with a secondary winding of a single-phase distribution transformer 10. FIG. 4 illustrates a typical split-phase implementation, in which respective transformer power flow controller units 400a, 400b are coupled in series with respective legs of a center-tapped secondary winding of a distribution transformer 10. FIG. 5 illustrates an alternative split-phase application in which a single transformer power flow controller unit 500 is coupled in series in a common return conductor of a split-phase service. Finally, FIG. 6 illustrates a three-phase implementation in which respective transformer power flow controller units 600a, 600b, 600c are coupled in series with respective phases A, B and C of a three phase service from a three-phase distribution transformer 10. It will be appreciated that the implementations shown in FIGS. 3-6 are provided for purposes of illustration, and that transformer power flow controllers according to various embodiments of the inventive subject matter may be used with any of a variety of different electrical service arrangements.

Figure 7:
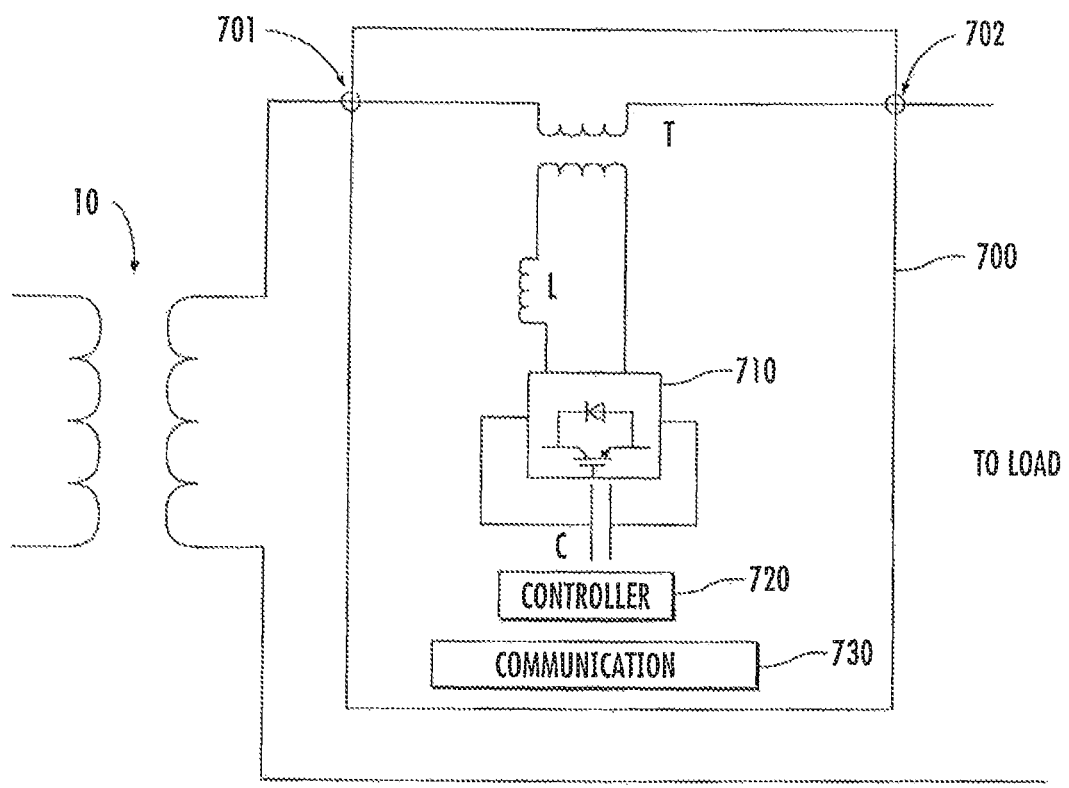
FIG. 7 is a schematic diagram illustrating a transformer based converter implementation for a transformer power flow controller according to some embodiments.
Figure 23A:
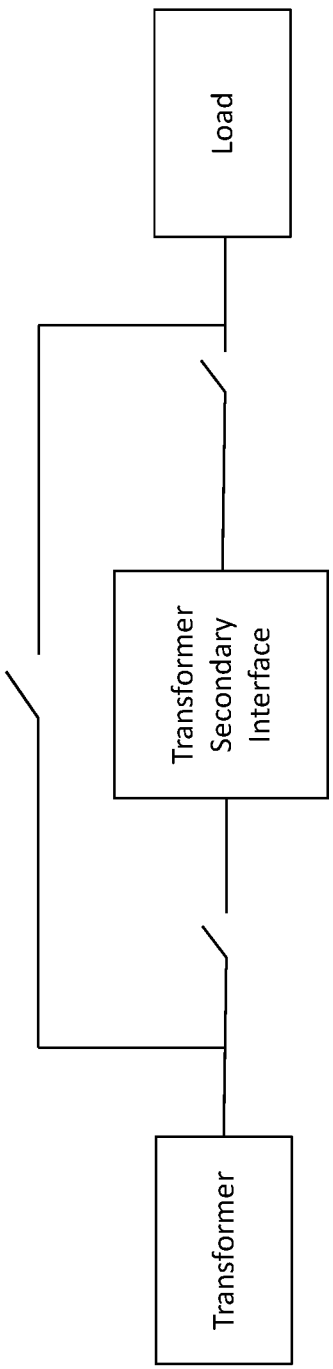
FIGS. 23(*a*) and (*b*) illustrate alternative embodiments.
Figure 23B:
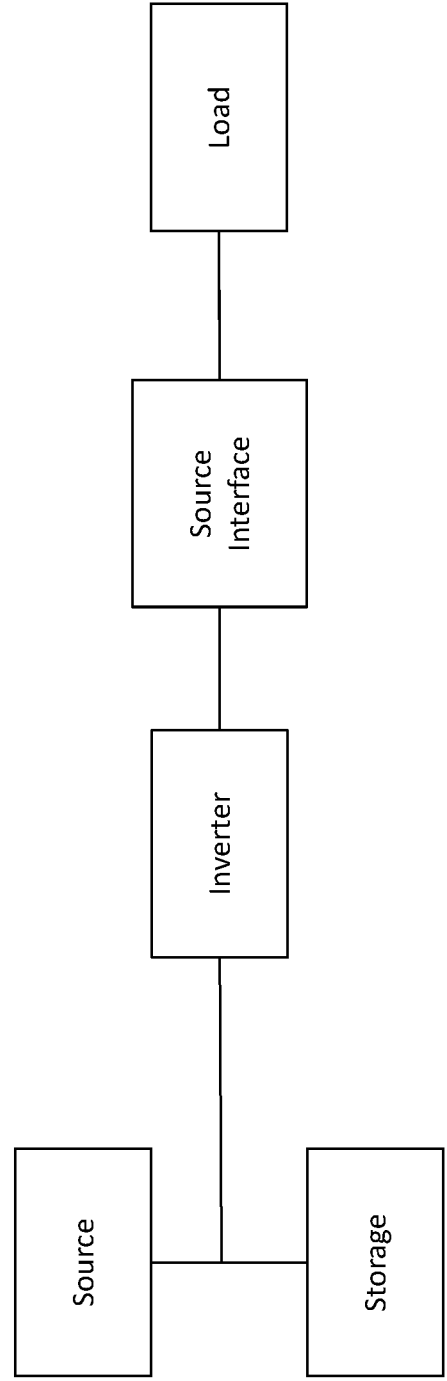

As noted above, in some embodiments, a transformer power flow controller may be implemented as a converter configured to be coupled in series between a distribution transformer secondary and a load and to be operated as an inverter that controls a voltage provided to the load. For example, as shown in FIG. 7, a transformer power flow controller 700 may include a transformer T having a first winding coupled between an external source terminal 701 and an external load terminal 702, such that it is coupled in series with a secondary winding of a distribution transformer 10. A second winding of the transformer T is coupled in series with a converter circuit including a filter inductor L coupled in series with a switching circuit 710. The switching circuit 710 is also coupled to at least one energy storage device, here shown as a capacitor C. It will be appreciated that the energy storage device may include any of a number of different types of energy storage devices, including capacitors, supercapacitors (ultracapacitors), batteries or combinations of such devices. In some embodiments, a power generation device, such as a photovoltaic cell or module, fuel cell or the like may also be coupled to the switching circuit 710. The transformer power flow controller 700 further includes a controller circuit 720, which is configured to drive the switching circuit 710 to control a voltage developed across the first winding of the transformer T. This may control reactive power transfer between the distribution transformer 10 and the load. The switching circuit 710 may include, for example, a circuit including gate driver devices, a clock circuit, resistive, inductive, and capacitive devices, semiconductor switching devices, such as insulated gate bipolar transistors (IGBTs) or power MOSFETs, either configured in a bridge or other arrangement. Additionally, circuit 710 may include nonvolatile memory for the purpose of storing performance and behavior data (i.e., similar to that of a controller), a bypass switch controlled by the processor, or an internal processor sending desired commands to the controller. The bypass switch controlled by the processor may be activated by an external communications stimulus or by internal fault detection. Upon activation of the switch, a communication signal will be sent externally of the apparatus. In some alternatives, a manual external bypass switch may be used to enable an operator to bypass the apparatus (See, e.g., FIG. 23(*a*), manual bypass).

It will be understood that the control circuit 720 may include analog circuitry, such as driver circuitry designed to drive such power transistor devices, and digital circuitry, such as a microprocessor, microcontroller or other processor, and/or combinations thereof. As further shown, the transformer power flow controller 700 may also include a communications circuit 730, operatively coupled to the controller 720 and configured, for example, to receive commands for operation of the transformer power flow controller 700 and/or to transmit status information relating to operation of the transformer power flow controller 700. It will be appreciated that the communications circuit may utilize wireline (e.g., Ethernet, power line carrier, etc.), optical (e.g., fiber optic), wireless (e.g., cellular or wireless local area network) or other communications techniques.

Figure 8:
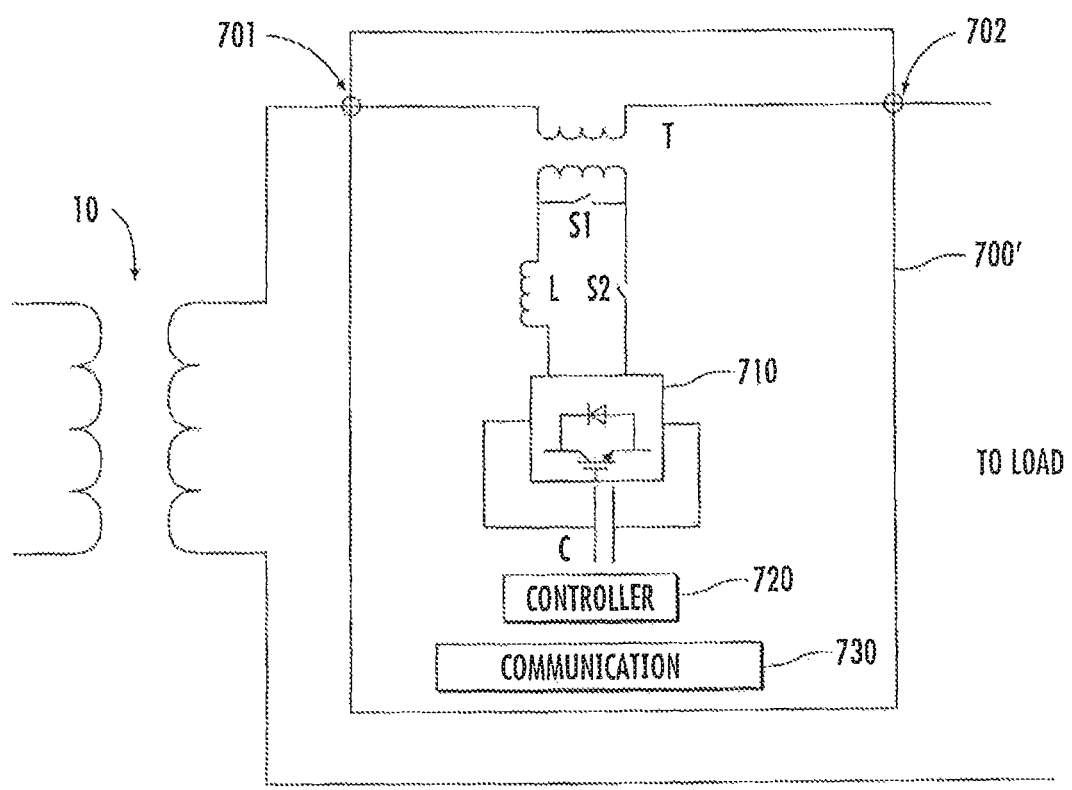
FIG. 8 is a schematic diagram of a converter implementation along the lines of FIG. 7 with bypass and disconnect switches according to some embodiments.

As shown in FIG. 8, a transformer power flow controller 700' similar to that shown in FIG. 7 may further include a bypass switch S1 and/or a disconnect switch S2. These switches S1, S2 may be used to disable the converter circuitry, such that the distribution transformer 10 may continue to power the load even if, for example, the transformer power flow controller 700' has failed or has been removed for service or replacement. It will be appreciated that the switches S1, S2 generally may be mechanical, electromechanical and/or semiconductor switches, and may be manually actuated by an operator at or near the unit and/or may be automatically and/or remotely controlled by or via the controller 720. For example, the switches S1, S2, may be automatically actuated responsive to the controller 720 detecting a failure condition and/or may be actuated by a control input (e.g., from a utility SCADA system) via the communications circuit 730.

Figure 9:
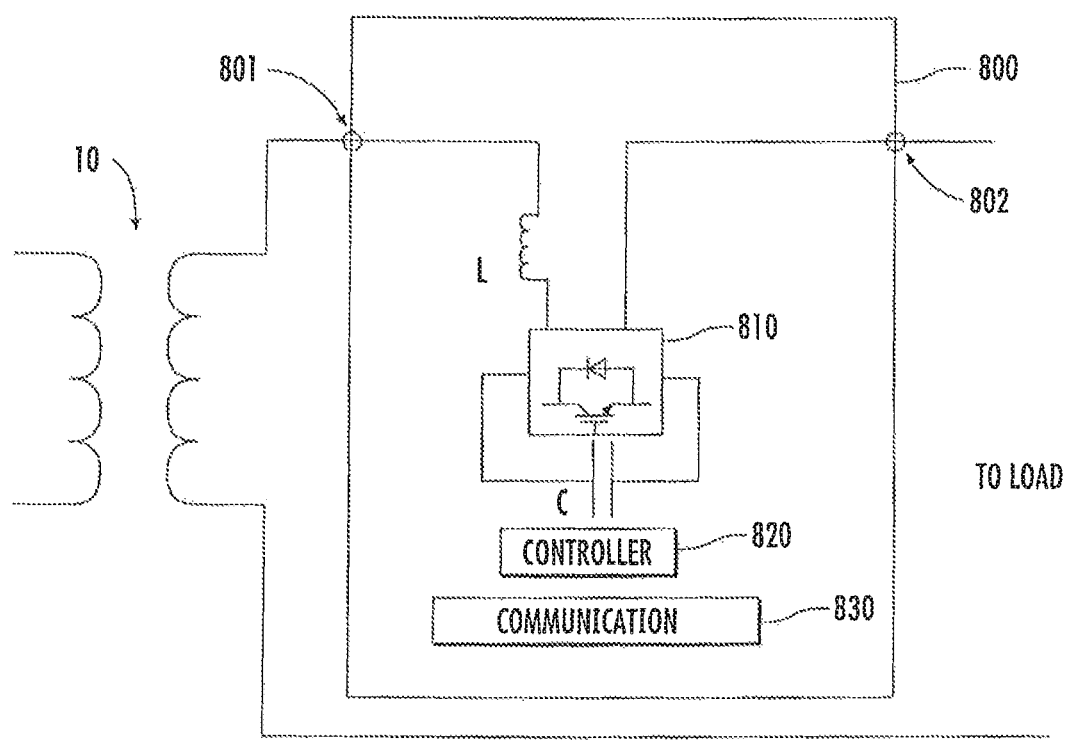
FIG. 9 is a schematic diagram illustrating a converter implementation for a transformer power flow controller according to further embodiments.
Figure 10:
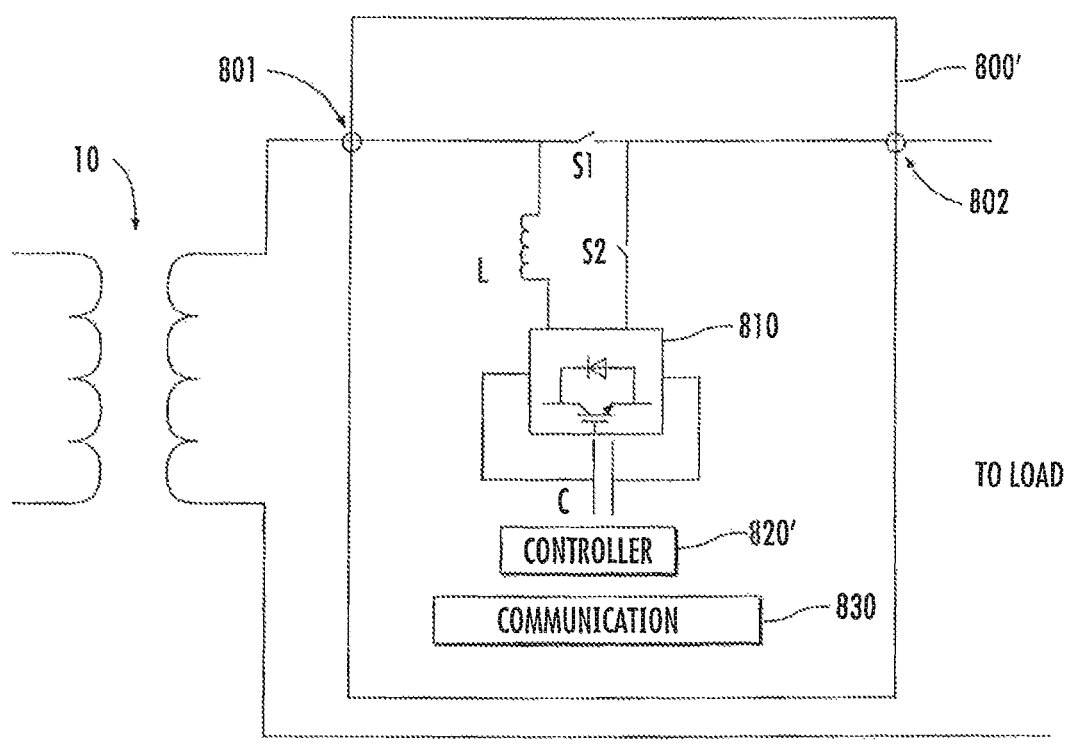
FIG. 10 is a schematic diagram illustrating a converter implementation along the lines of FIG. 9 with bypass and disconnect switches according to some embodiments.
Figure 11:
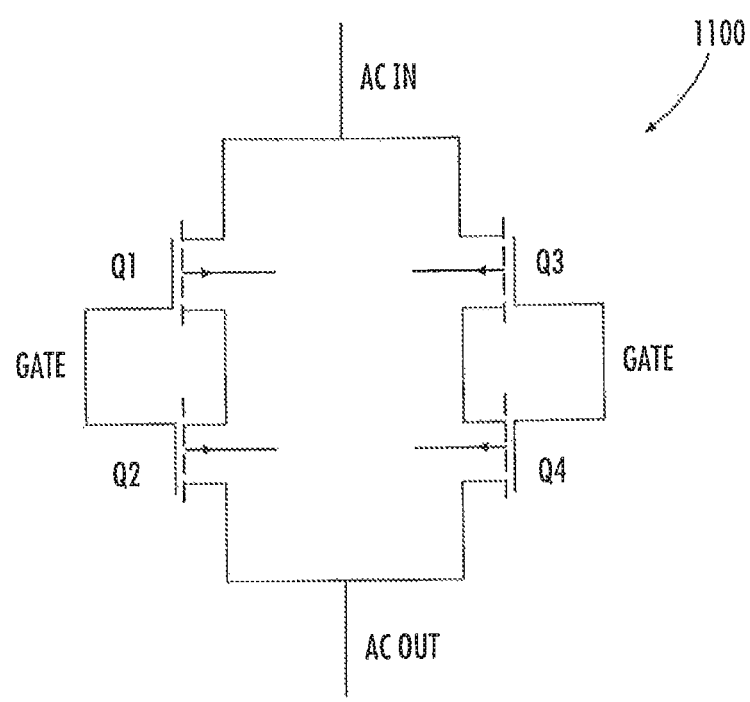
FIG. 11 is a schematic diagram illustrating semiconductor switch circuit for use as a bypass or disconnect switch in a transformer power flow controller according to some embodiments.

According to further embodiments, a series converter without an intermediate transformer may be used. Referring to FIG. 9, a transformer power flow controller 800 according to some embodiments may include a series converter coupled between an external source terminal 810 and an external load terminal 802. The series converter includes a filter inductor L coupled in series with a switching circuit 810. The switching circuit 810 is also coupled to at least one energy storage device, here shown as a capacitor C. It will be appreciated that the energy storage device may include any of a number of different types of energy storage devices, including capacitors, supercapacitors (ultracapacitors), batteries or combinations of such devices. In some embodiments, a power generation device, such as a photovoltaic cell or module, fuel cell or the like may also be coupled to the switching circuit 810. The transformer power flow controller 800 further includes a controller circuit 820, which is configured to control the switching circuit 810 to control a voltage developed across the series combination of the filter inductor L and the switching circuit 810, thus controlling reactive power transfer between the distribution transformer 10 and the load. It will be understood that the control circuit 820 may include analog circuitry, digital circuitry (e.g., a microprocessor or microcontroller) and/or a combination thereof. As further shown, the transformer power flow controller 800 may also include a communications circuit 830, operatively coupled to the controller 820 and configured, for example, to receive commands for operation of the transformer power flow controller 800 and/or to transmit status information relating to operation of the transformer power flow controller 800. FIG. 10 illustrates a transformer power flow controller 800' with a similar structure, with added bypass and disconnect switches S1, S2. The switches S1, S2 may be used to disable the converter circuitry in a manner similar to that discussed above with reference to FIG. 8. FIG. 11 illustrates an example of a semiconductor switch 1100, including MOSFET transistors Q1, Q2, Q3, Q4, which may be used for the bypass and/or disconnect switches S1, S2 of FIGS. 8 and 10.

Figure 12:
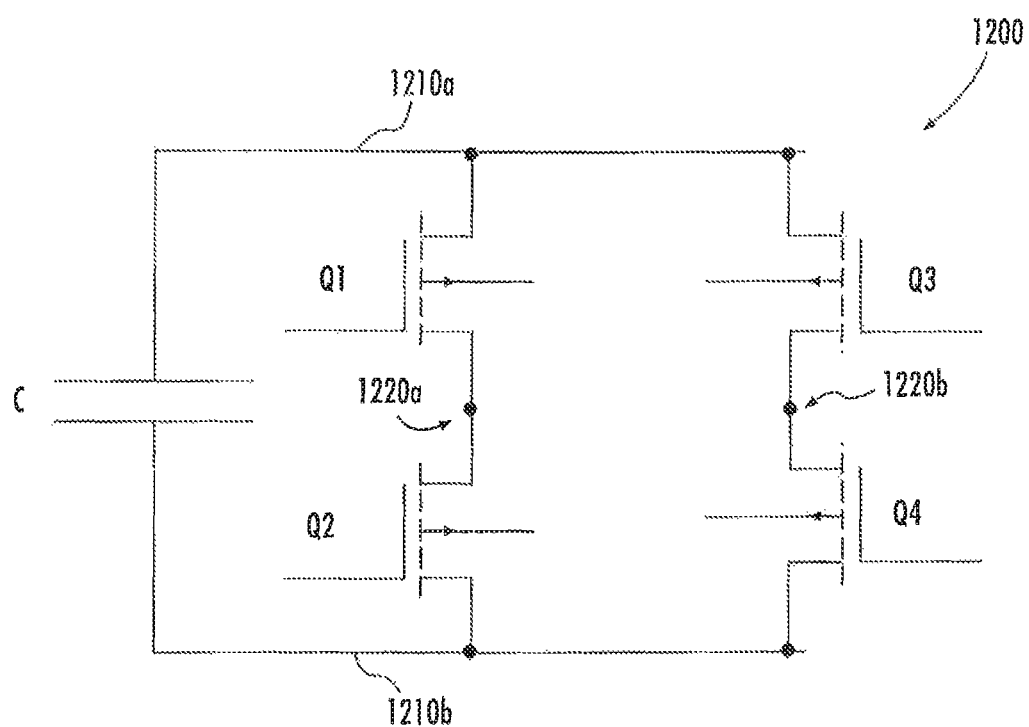
FIG. 12 is a schematic diagram illustrating a bridge converter circuit for use in a transformer power flow controller according to some embodiments.

FIG. 12 illustrates a bridge circuit 1200 that may be used for the switching circuits 710, 810 of FIGS. 7-10. The bridge circuit 1200 includes two pairs of serially coupled transistors Q1/Q2, Q3/Q4 connected between first and second buses 1210a, 1210b, which are coupled to respective terminals of a DC capacitor C. The bridge circuit 1200 is coupled to the AC line at respective nodes 1220a, 1220b where the transistor pairs Q1/Q2, Q3/Q4 are connected. The connection may be, for example, as shown in FIG. 7 or 8. Referring to FIG. 7, for example, such an arrangement may be used for the switching circuit 710 by coupling one of the nodes 1220a to the filter inductor L and the other of the nodes 1220b to the secondary winding of the transformer T. In some embodiments, the transistors in each of the half-bridge pairs Q1/Q2 and Q3/Q4 may be pulse-width modulated in a complementary fashion at a switching frequency several times greater than the fundamental frequency of the AC line voltage (e.g., 60 Hz). It will be appreciated that the bridge circuit 1200 is provided for purposes of illustration, and that other switching circuit arrangements may be used in other embodiments.

Figure 13:
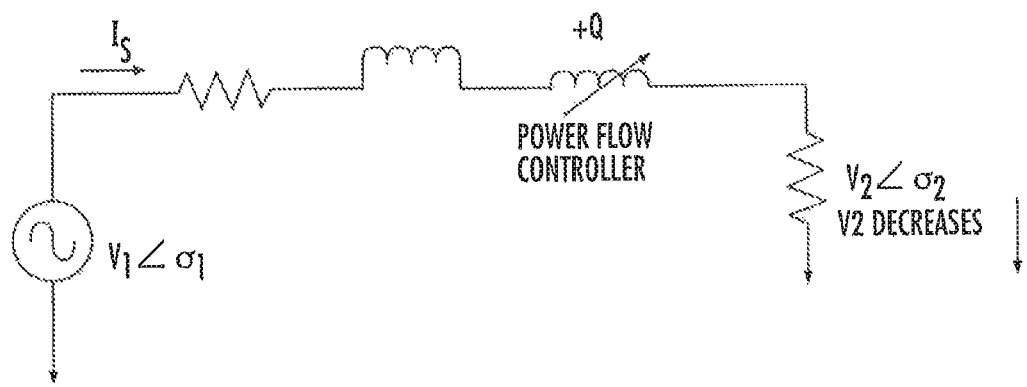
FIGS. 13 and 14 are schematic diagrams conceptually illustrating reactive power flow control by a transformer power flow controller according to some embodiments.
Figure 14:
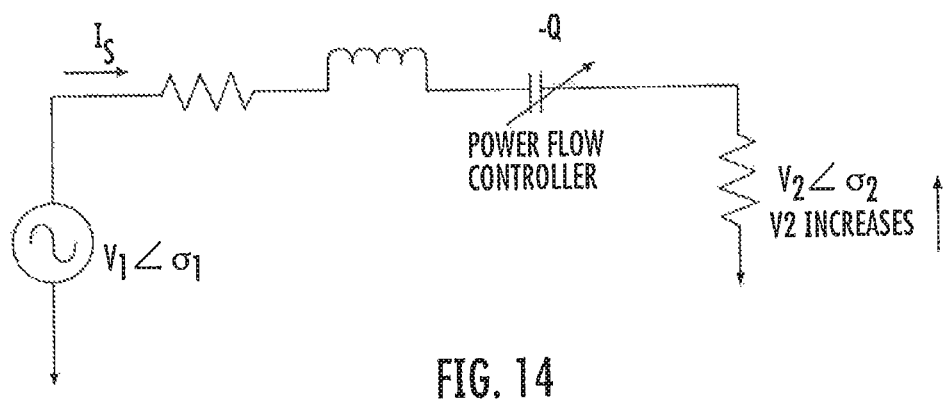

According to some embodiments, a transformer power flow controller along the lines described above may be operated as a variable reactance device that provides reactive power flow control. FIGS. 13 and 14 conceptually illustrate power flow relationships between a source having a voltage magnitude V1 and phase a1 and providing a current Is and a load having a voltage magnitude V2 and phase o2 under control of a variable reactance provided by a transformer power flow controller. Referring to FIG. 13, in an inductive mode, the transformer power flow controller may act as an inductor, providing positive reactive power flow +Q and reducing the load voltage magnitude V2. In a capacitive mode, the transformer power flow controller may act as a capacitor, providing negative reactive power flow −Q and increasing the load voltage magnitude V2.

Figure 15:
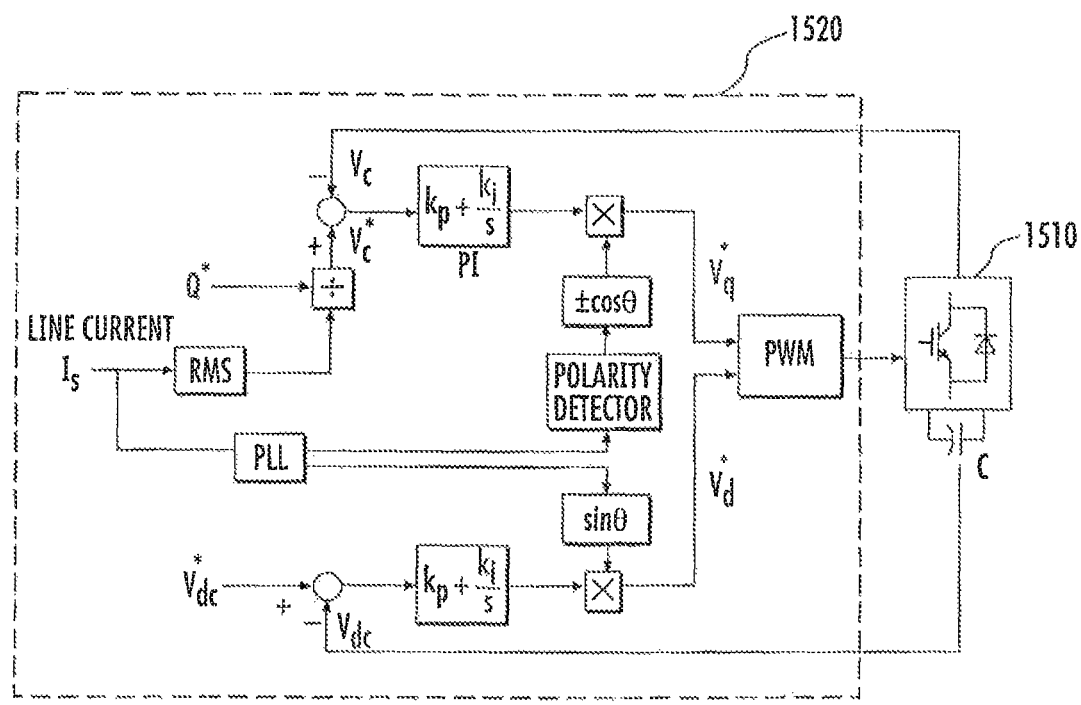
FIG. 15 is a schematic diagram illustrating a sample controller implementation for a transformer power flow controller.

FIG. 15 illustrates a sample control architecture 1520 that may be used in a transformer power flow controller using a high-frequency switching bridge circuit along the lines illustrated in FIG. 12 according to some embodiments. A line current signal Is, a converter AC output voltage Vc and a DC voltage Vdc of an energy storage capacitor C are received as inputs, and d-q space vector control component signals Vq and Vd are generated for provision to a pulse width modulator (PWM) that drives a converter 1510 which, for example, provides appropriately modulated gate drive signals to bridge transistors in a bridge circuit such as the bridge circuit 1200 of FIG. 12. A signal representing a desired reactive power Q* is divided by a signal representative of the RMS value of the line current to generate a signal representing a desired AC output voltage Vc*. The desired AC voltage Vc* signal is compared to a signal representing the actual AC output voltage Vc to generate an error signal that is processed through a proportional integrator (PI) compensator. The q component signal Vq is generated from the output of the PI compensator using phase information derived from the line current signal Is. The controller 1520 compares a desired DC voltage Vdc* to the actual DC voltage Vdc to produce an error signal that is provided to another P1 compensator. The d component signal Vd is generated from the output of this PI compensator using phase information also derived from the line current signal Is. This arrangement regulates the AC output voltage Vc to provide a desired reactive power flow and regulates the DC voltage on the energy storage capacitor C. In some embodiments, the capacitor C may be chosen to be large enough such that the ripple voltage on it is relatively small in relation to the average DC voltage on the capacitor C. For example, in a converter as illustrated in FIG. 12 in a 60 Hz application, 120 Hz current may flow through the capacitor C, so it may be desirable to reduce or minimize the 120 Hz current-caused voltage ripple.

It will be appreciated that the control architecture illustrated in FIG. 15 may be implemented, for example, using a microprocessor, microcontroller or other data processing device. In some embodiments, the architecture may include non-volatile storage capabilities for the tracking of historical behavior leading to ad hoc modifications to the control. Such data processing circuitry may be used in conjunction with, for example, analog circuitry that performs analog to digital signal conversion and other operations. It will be understood, however, that similar control may be implemented using analog circuitry or combinations of analog and digital circuitry other than microprocessor type devices. It will be further understood that the control architecture described with reference to FIG. 15 is provided for purposes of illustration, and that any of a variety of other control architectures may be used.

Figure 16:
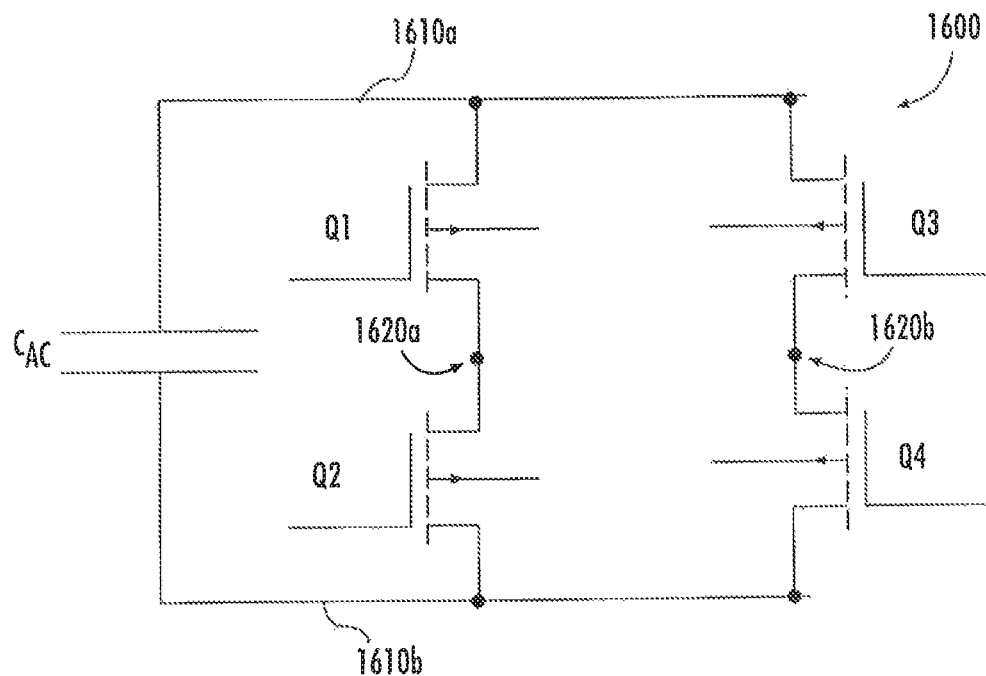
FIGS. 16 and 17 are schematic diagrams illustrating alternative converter implementations for a transformer power flow controller according to further embodiments.

According to further embodiments, a transformer power flow controller may use non-polar storage unit in conjunction with a switching circuit that is operated at the fundamental AC line frequency, instead of using relatively high-frequency PWM-type switching circuits. Referring to FIG. 16, a full bridge switching circuit 1600 includes half-bridges with respective pairs of serially coupled transistors Q1/Q2 and Q3/Q4 connected between first and second buses 1610a, 1610b. A nonpolar capacitor CAC is coupled between the buses 1610a, 1610b. The AC line is coupled to the switching circuit 1600 at respective junctions 1620a, 1620b of the transistor pairs Q1/Q2, Q3/Q4. Referring to FIG. 7, for example, one of the junction nodes 1620a may be coupled to the filter inductor L and the other of the junction nodes 1620b may be coupled to the secondary winding of the transformer T. In contrast to the converter 1200 described above with reference to FIG. 12, however, the transistors Q1, Q2, Q3, Q4 of the bridge circuit 1600 are operated at the fundamental line frequency (e.g., 60 Hz), with the voltage across the output port controlled by the timing of the operations of the transistors Q1, Q2, Q3, Q4 with respect to the line voltage waveform. For example, the switching circuit 1200 may be operated to selectively couple the capacitor CAC to the AC line terminals 1220a, 1220b to control reactive power transfer, such that the switching circuit 1200 and the capacitor CAC operate as a magnetic energy recovery switch (MERS), along the lines of that described in U.S. Pat. No. 7,843,166 to Shimada et al., the disclosure of which is hereby incorporated by reference. Each of the transistors Q1, Q2, Q3, Q4 may be switched at the fundamental frequency, in a manner analogous to that described in the article "Characteristics of the Magnetic Energy Recovery Switch (MERS) as a Series FACTS Controller," Wiik et al., IEEE Transactions on Power Delivery, Vol. 24, No. 2 (April 2009).

Figure 17:
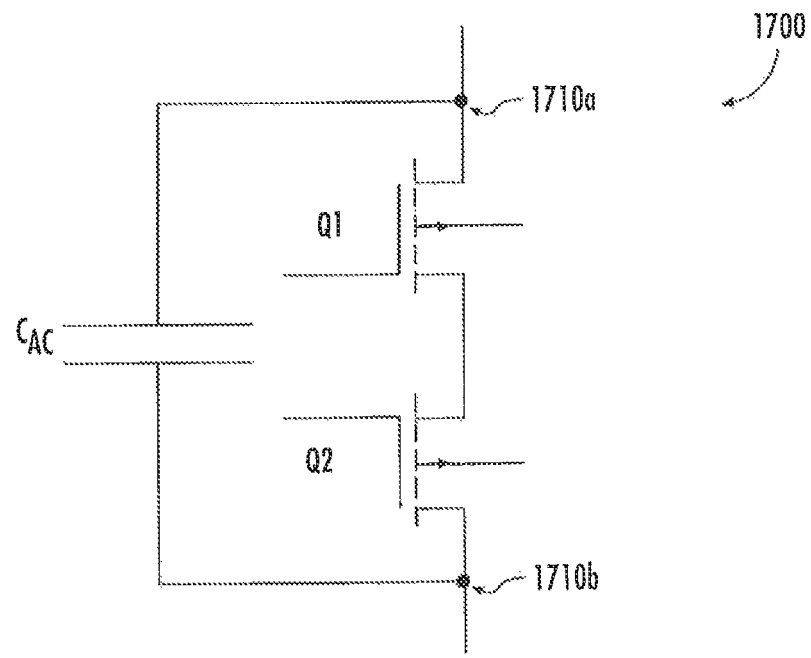

FIG. 17 illustrates a half-bridge switching circuit 1700 with transistors Q1, Q2 and a nonpolar capacitor CAC coupled between first and second nodes 1710a, 1710b which are configured to be coupled to the AC line. For example, referring to FIG. 7, one of the nodes 1710a may be coupled to the filter inductor L and the other of the junction nodes 1710b may be coupled to the secondary winding of the transformer T. Alternatively, instead of a transformer cited in 1710b, the device can also be connected to the inverter of an energy storage device or renewable generation source. Also, the capacitor C may be replaced with any AC voltage source (i.e., denoted in any figure by a long line over a short line.) The switching circuit 1700 selectively couples the capacitor CAC to the AC line terminals 1220a, 1220b to control reactive power transfer, providing operations analogous to the operations of a gate controlled series capacitor (GCSC) described in the article "GCSC—Gate Controlled Series Capacitor: a New Facts Device for Series Compensation of Transmission Lines," Watanabe et al., 2004 IEEE/PES Transmission and Distribution Conference and Exposition: Latin America (2004).

Figure 18:
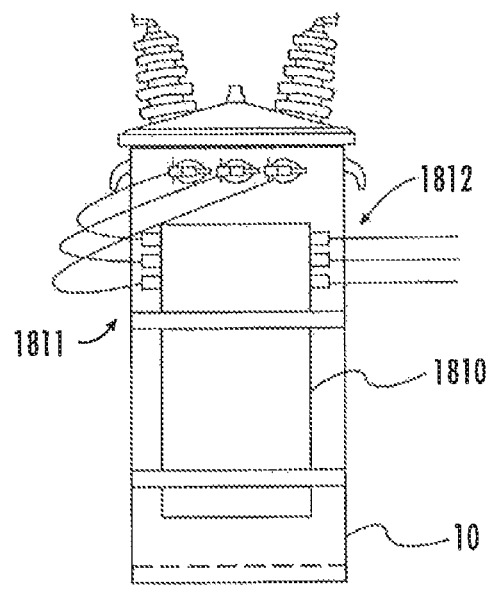
FIGS. 18 and 19 illustrate example mechanical configurations for transformer power flow controller units according to some embodiments.
Figure 19:
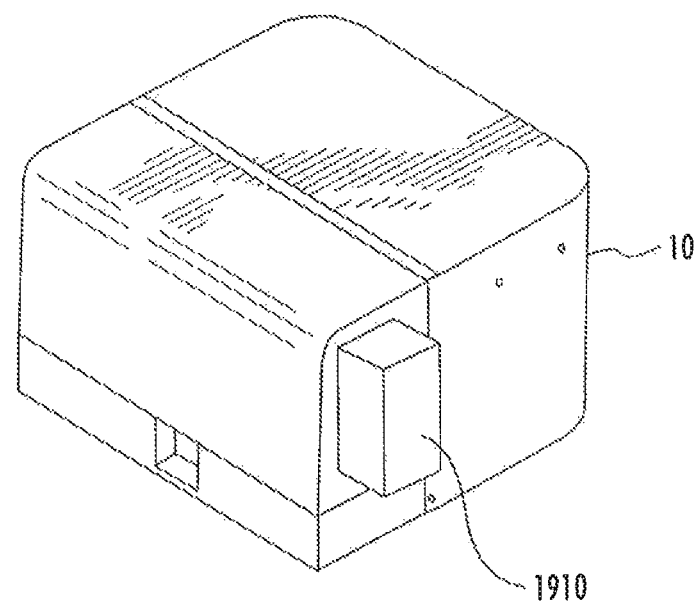

According to some embodiments, a transformer power flow controller may be implemented or packaged as a unit configured to be mounted proximate to a desired location, such as a distribution transformer, (i.e., on and/or in the transformer housing) and/or on a structure used to support the transformer, such as a utility pole or pad, or some other location or apparatus. For example, as shown in FIG. 18, a transformer power flow controller unit 1810 may be configured to be mounted on the case of a pole-mounted distribution transformer 10. The unit 1810 may include at least one external source terminal 1811 configured to be coupled to a secondary terminal of the transformer 10 and at least one external load terminal 1812 configured to be coupled to one or more loads. For two-wire single-phase operations, e.g., as shown in FIG. 3, such a unit 1810 may include a single transformer power flow controller circuit. In split-phase (two-phase or three-wire single phase) applications and three-phase application, e.g., as shown in FIGS. 4 and 6, such a unit 1810 may include multiple power flow controller circuits. It will be further appreciated that a transformer power flow controller unit may be mounted or positioned in a number of other different ways, such as on a service pole adjacent a pole mounted distribution transformer. Referring to FIG. 19, a similar transformer power flow controller unit 1910 may be mounted on, in and/or or near a pad mounted distribution transformer 10. It will be further appreciated that a transformer power flow controller unit may be positioned at other locations, such as in or near a meter base.

In some embodiments, one or more such transformer power flow controller units may be used to retrofit existing distribution transformers to provide improved performance. For example, such a unit may be installed on or near the distribution transformer and electrically coupled to the secondary of the distribution transformer and to the load. As discussed above, the unit may also have communications capabilities that support additional capabilities, such as metering and load control (e.g., shedding).

Figure 20:
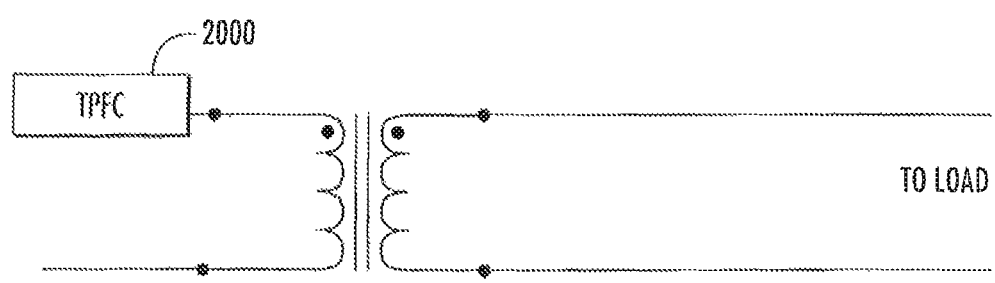
FIG. 20 is a schematic diagram illustrating a primary side transformer power flow controller according to further embodiments.

According to further embodiments, a transformer power flow controller may also be implemented on a primary side of a distribution transformer. For example, referring to FIG. 20, a transformer power flow controller 2000 may be inserted in series with the primary winding of a distribution transformer 10 having a load connected to its secondary winding. The transformer power flow controller 2000 may have an architecture similar to that of the secondary side devices described above with reference to FIGS. 1-19, but it will be appreciated that, because of the typically significantly higher voltages present on the primary, different types of semiconductor devices and/or arrangements of semiconductor devices may be utilized.

Figure 21:
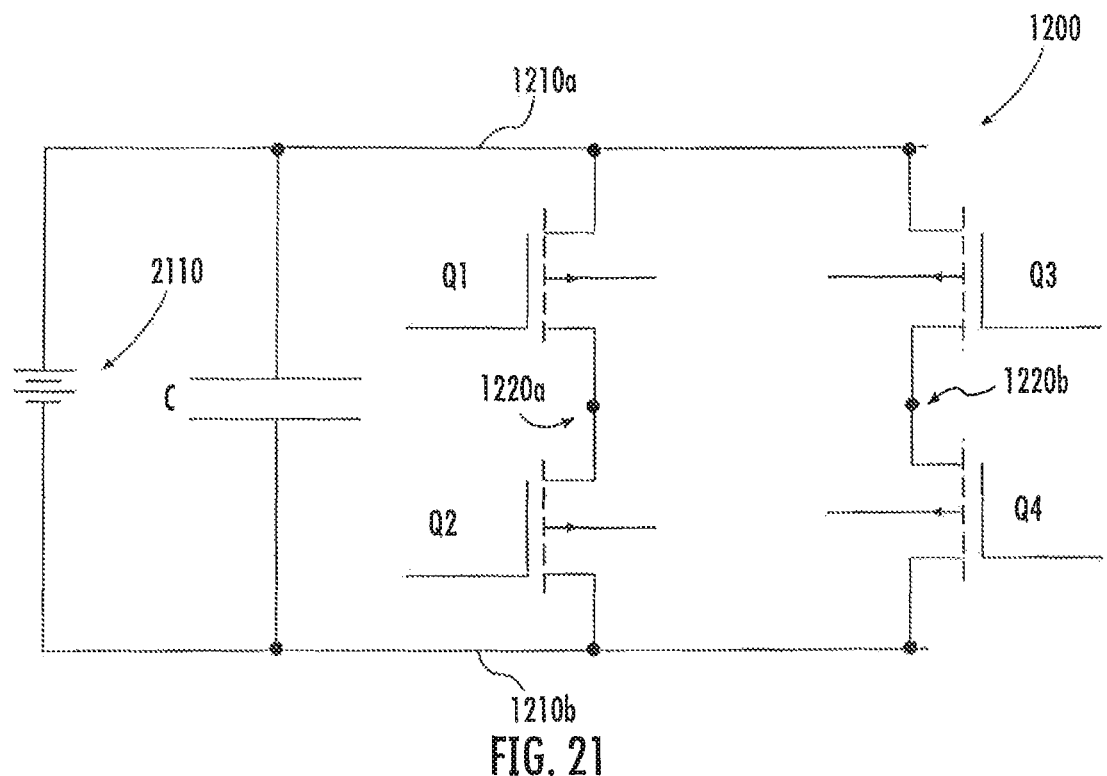
FIG. 21 is a schematic diagram illustrating interfacing of at least one battery to a transformer power flow controller according to some embodiments.
Figure 22:
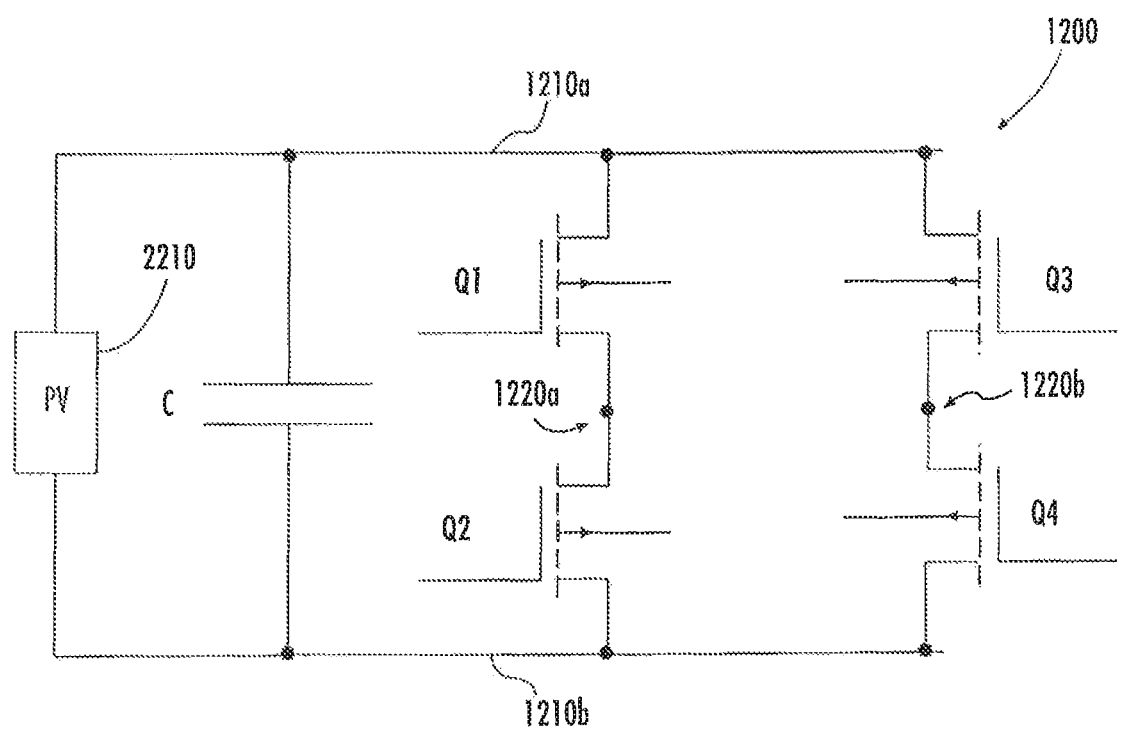
FIG. 22 is a schematic diagram illustrating interfacing of at least one photovoltaic cell or module to a transformer power flow controller according to further embodiments.

According to further embodiments, a distribution transformer power flow controller may be coupled to energy storage devices, such as batteries, and/or to power generation devices, such as photovoltaic systems, wind generation systems, fuel cells and the like. For example, as shown in FIG. 21, a switching circuit 1200 of a distribution transformer power flow controller along the lines described above with reference to FIG. 12, may also be interfaced to at least one battery 2110. In addition to the reactive power transfer, the switching circuit 1200 may also support real power transfer to and from the at least one battery 2110. Similarly, as shown in FIG. 22, a switching circuit 1200 of a distribution transformer power flow controller may also be coupled to a power generation device, such as a photovoltaic (PV) system 2210, and may support real power transfer from the PV system to the line. Such arrangements may be used, for example, to support grid integration of alternative energy sources, peak shaving and other capabilities.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:
1. An apparatus comprising:
at least one external source terminal configured to be coupled to a distribution transformer;
at least one external load terminal configured to be coupled to a load;
a converter circuit configured to be coupled between the at least one external source terminal and the at least one external load terminal to provide series connection of the converter circuit with the load and series connection of the converter circuit with the distribution transformer;
wherein the converter circuit provides a correction voltage vector, variable in magnitude and phase angle, to a voltage received at the external source terminal to yield a desired AC output voltage vector at the external load terminal, thereby enabling variable, bi-directional control of real and reactive power flow through the apparatus;

and further wherein a power flow generated by the converter circuit is substantially less than the power flow from the distribution transformer to the load, and wherein the apparatus is independent of the distribution transformer.

2. The apparatus of claim 1, wherein the converter circuit is further configured to be coupled to at least one energy storage capacitor.

3. The apparatus of claim 1, wherein the converter circuit is configured to be coupled to an inverter for attaching to a DC generation source.

4. The apparatus of claim 1, further comprising a switch configured to disable the converter circuit.

5. The apparatus of claim 1, further comprising a manual external bypass switch configured to enable an operator to bypass the apparatus.

6. The apparatus of claim 1, wherein the converter is configured to be coupled to at least one energy storage capacitor, at least one battery and/or at least one power generation device.

7. The apparatus of claim 1, wherein the converter is configured to be coupled to at least one storage capacitor and/or at least one power generation device coupled by an inverter.

8. The apparatus of claim 1, wherein the at least one external source terminal, the at least one external load terminal and the converter circuit are packaged in a unit configured to be mounted proximate a desired location.

9. The apparatus of claim 8, wherein the unit is configured to be mounted on and/or in a housing of the distribution transformer and/or on a structure supporting the distribution transformer.

10. The apparatus of claim 1, further comprising a communications circuit coupled to the converter circuit and configured to support control and/or monitoring of the converter circuit.

11. The apparatus of claim 1, further comprising a non-volatile storage device for the storage of historic behavioral data.

12. An apparatus comprising:
at least one external source terminal configured to be coupled to a distribution transformer;
at least one external load terminal configured to be coupled to a load;
a converter circuit coupled to at least one energy storage device and configured to be coupled to the at least one external source terminal and the at least one external load terminal to provide series connection of the converter circuit with the load and series connection of the converter circuit with the distribution transformer, the converter circuit configured to generate a correction voltage vector, variable in magnitude and phase angle, between the at least one external source terminal and the at least one external load terminal responsive to a current and a voltage at the at least one external source terminal to yield a desired AC output voltage vector at the external load terminal, thereby enabling variable, bi-directional control of real and reactive power flow through the apparatus;

wherein the power flow generated by the converter circuit is substantially less than the power flow from the distribution transformer to the load, and wherein the apparatus is independent of the distribution transformer.

13. The apparatus of claim 12, wherein the load comprises an inductive element.

14. The apparatus of claim 12, wherein the load comprises a capacitive element.

15. The apparatus of claim 12, further comprising the at least one energy storage device.

16. A method of retrofitting an existing distribution transformer, the method comprising:
mounting a transformer power flow controller unit proximate the existing distribution transformer, the transformer power flow controller unit comprising a converter circuit;
connecting external terminals of the transformer power controller unit to an output of the distribution transformer and a load to couple the converter circuit in series with the load and couple the converter circuit in series with the distribution transformer; and
operating the converter circuit provide a correction voltage vector, variable in magnitude and phase angle, to a voltage received at the external terminals to yield a desired AC output voltage vector at the load, thereby enabling variable, bi-directional control of real and reactive power flow through the apparatus;

wherein a power flow generated by the converter circuit is substantially less than a power flow from the distribution transformer to the load.

17. The method of claim 16, further comprising actuating a switch in the transformer power flow control unit to disable the converter circuit.

* * * * *